United States Patent [19]
Dixit

[11] Patent Number: 5,260,783
[45] Date of Patent: Nov. 9, 1993

[54] LAYERED DCT VIDEO CODER FOR PACKET SWITCHED ATM NETWORKS

[75] Inventor: Sudhir S. Dixit, Norwood, Mass.

[73] Assignee: GTE Laboratories Incorporated, Waltham, Mass.

[21] Appl. No.: 659,191

[22] Filed: Feb. 21, 1991

[51] Int. Cl.$^5$ .............................................. H04N 7/12
[52] U.S. Cl. .................................... 358/136; 358/135
[58] Field of Search .............. 358/133, 135, 136, 105, 358/11, 12, 13, 141; 382/56, 49; 370/60, 94.1

[56] References Cited

U.S. PATENT DOCUMENTS

| | | | |
|---|---|---|---|
| 4,460,923 | 7/1984 | Hirano et al. | 358/136 |
| 4,743,967 | 5/1988 | Takenaka et al. | 358/133 |
| 4,802,006 | 1/1989 | Linuma et al. | 358/135 |
| 4,837,618 | 6/1989 | Hatarc et al. | 358/136 |
| 4,942,465 | 7/1990 | Ohta | 358/133 |

Primary Examiner—James J. Groody
Assistant Examiner—Michael H. Lee
Attorney, Agent, or Firm—Lawrence E. Monks

[57] ABSTRACT

A digital video encoder encodes a video frame into a differential video frame for transmission over a packet switched network. The video encoder includes an inter-frame encoder, an intra-frame encoder, and an encoding selector for selecting between the inter-frame and intra-frame encoder depending on the relative motion between the video frame being encoded and the previous video frame.

A composite frame combiner provides a composite intra/inter-frame encoded difference frame having one set of pixels encoded by the inter-frame encoder, and another set of pixels encoded by the intra-frame encoder. The set of intra-frame encoded pixels includes at least one square or rectangular pixel block, a vertical strip of pixel blocks, and a horizontal strip of pixel blocks.

Difference frames are encoded into separable data sets representing video information within a particular range of image resolution. A discrete cosine transform (DCT) is used to transform the difference pixels into corresponding DCT coefficients which are separable, by resolution, into the data sets providing coefficient layers.

A packetizer formats the data sets into asynchronous transfer mode (ATM) packets for transmission over network.

33 Claims, 16 Drawing Sheets

A COMBINED INTRA/INTER FRAME DCT CODER BLOCK DIAGRAM

A COMBINED INTRA/INTER FRAME DCT CODER BLOCK DIAGRAM

TABLE I
INTRA-FRAME CODER

| FIG. | CHARACTERISTICS | S/N RATIO dB | BIT RATE bpp |
|---|---|---|---|
| 11(A) | LOW RES. (NO CELL LOSS) | 29.26 | 0.49 |
| 11(B) | MED. RES. (NO CELL LOSS) | 34.12 | 0.96 |
| 11(C) | MED-HIGH RES. (NO CELL LOSS) | 39.27 | 1.68 |
| 11(D) | HIGH RES. (NO CELL LOSS) | 43.32 | 2.38 |
| 13(A) | HIGH RES. (WITH 5% CELL LOSS IN ALL LAYERS EXCEPT THE LOW-RES) | 40.34 | 2.38 |
| 13(B) | HIGH RES. (WITH 5% LOSS IN LOW-RES. LAYER ONLY) | 33.34 | 2.38 |

*FIG. 14A*

TABLE II
COMBINED INTER-INTRA-FRAME CODER

| FIG. | CHARACTERISTICS | S/N RATIO dB | BIT RATE bpp |
|---|---|---|---|
| 12(A) | LOW RES. (NO CELL LOSS) | 30.09 | 0.49 |
| 12(B) | MED. RES. (NO CELL LOSS) | 33.67 | 0.96 |
| 12(C) | MED-HIGH RES. (NO CELL LOSS) | 33.17 | 1.68 |
| 12(D) | HIGH RES. (NO CELL LOSS) | 40.93 | 2.38 |
| 13(C) | HIGH RES. (WITH 5% CELL LOSS IN ALL LAYERS EXCEPT THE LOW-RES) | 39.51 | 2.38 |
| 13(D) | HIGH RES. (WITH 5% LOSS IN LOW-RES. LAYER ONLY) | 38.80 | 2.38 |

*FIG. 14B*

LAYERED DCT VIDEO CODER FOR PACKET SWITCHED ATM NETWORKS

BACKGROUND OF THE INVENTION

This invention relates to systems for transmission and reception of digital video over packet switched digital networks.

Packet switched digital networks are used to transfer packets of digitized data among users coupled to the network. Data to be sent over the network, from a source device to a receiving device, is typically combined with a header containing an address to form a data packet for transmission. The address portion of the packet directs the packet to the desired receiving device on the network to establish a virtual communications channel, or digital end-to-end connection, between the source device and the receiving device. The data portion of the packet is formatted to correspond to the requirements of any one or more of the services available on the network.

Traditionally, networks were customized to specifically accommodate only certain types of services, which lead to a variety of incompatible, service-oriented communications networks. In recent years, the CCITT has adopted a series of standard multi-purpose user network interfaces (UNI) for an integrated services digital network (ISDN) supporting a wide range of voice and non-voice services over a digital end-to-end connection. The CCITT has considered a number of broadband network interface approaches supporting a wide range of data, voice, and video services, including Asynchronous Transfer Mode (ATM), which stands out among the other approaches. ATM is a connection oriented transfer technique, where fixed-size ATM data packets (cells) from different sources are asynchronously multiplexed onto a communications channel, providing efficiencies in bandwidth utilization and allocation of variable bandwidths to different services.

Video services vary greatly in their bandwidth and image resolution requirements. For instance, video telephone service requires relatively little bandwidth compared to the bandwidth requirements for high definition television (HDTV) services. Data compression is necessary to minimize the bandwidth requirements for all video services on a network, especially where network congestion is anticipated. Furthermore, the differing image resolution requirements of the various video services creates a compatibility issue among services desiring to use the same video information transmitted on the network. A compatible video encoding scheme is necessary to provide data compatibility among the video services.

Packet switched networks may experience data loss, due to, for instance, data buffer overflows or errors in the packet headers. Data loss typically affects the video quality of the transmitted images in various ways, depending on how the video image is encoded and packaged into ATM data packets. Robust video encoding techniques are required to minimize the effect of lost data on the quality of video images sent across the network.

SUMMARY OF THE INVENTION

In general, in one aspect this invention features an apparatus and a method for encoding a digital video frame into a differential video frame for transmission over a digital communications channel such as a packet switched network. An inter-frame encoder encodes a pixel of the video frame into a corresponding differentially encoded pixel of the difference frame dependent on another, previous in time, video frame. An intra-frame encoder encodes a pixel of the video frame into a corresponding differentially encoded pixel of the difference frame dependent on other pixels within the same video frame. An encoding selector selects between either the inter-frame encoder or the intra-frame encoder for encoding the pixels of the video frame dependent on the relative motion between the video frame being encoded and the previous video frame.

Preferred embodiments include an encoding selector having a motion detector for detecting the relative motion between the video frame to be encoded and the previous video frame. The motion detector provides a decision parameter K representing the level of relative detected motion. The encoding selector compares K against a threshold parameter T and selects the inter-frame encoder when $K < T$ and the intra-frame encoder when $K \geq T$.

Other preferred embodiments feature a composite frame combiner providing a composite intra/inter-frame encoded difference frame having one set of pixels encoded by the inter-frame encoder, and another set of pixels encoded by the intra-frame encoder. The set of intra-frame encoded pixels includes at least one square pixel block, a vertical strip of pixel blocks, and a horizontal strip of pixel blocks. Preferred embodiments include horizontally offsetting the vertical strip position by at least one pixel block width from one frame to the next, or similarly vertically offsetting the horizontal strip position.

Yet other preferred embodiments feature a layered resolution encoder for encoding the pixels of the difference frame into separable data sets each representing video information within a particular range of image resolution. A discrete cosine transform (DCT) is used to transform the difference pixels into corresponding DCT coefficients which are separable, by resolution, into the data sets providing coefficient layers. The DCT is performed on square blocks of pixels within the difference frame to provide corresponding blocks of DCT coefficients. Each block of DCT coefficients is separated into coefficient layers.

Still other preferred embodiments include a packetizer for formatting the video image data sets into asynchronous transfer mode (ATM) packets for transmission over the digital communications channel. The ATM packets include a header field having data for establishing a virtual communications channel between selected devices on the digital communications channel, and an information field for transferring the data sets between the selected devices. The information field includes an adaptation overhead field having a cell sequence number, and a sync flag. The logical state of the sync flag indicates the composition of the remainder of the information field. In one case, the remainder of the information field includes an adaptation overhead portion having a coding mode field, a comp type field, a strip location field and a resolution information field. In another case, the remainder of the information field includes a data field having the DCT coefficient data sets.

The digital video encoding apparatus and method of this invention thus provides a flexible system for transferring video information among a wide range of video devices on a digital communications network. The layered resolution encoding of this invention provides compatibility among the different video services on the network, while maintaining the video quality of each type of service. Layered encoding also provides significant data compression and adds robustness to digital packet cell loss. Further, network congestion control is provided by dropping cells containing higher resolution information without introducing significant visual artifacts.

The composite intra/inter-frame encoding mode of this invention alleviates the problem of error propagation through inter-frame encoded video frames by providing a circulating intra-frame encoded strip which refreshes a section of each inter-frame encoded frame. Variable bit rate (VBR) output is generated by exploiting the redundancy or variation in the information content from frame-to-frame, and by dropping those layers of video information which have insufficient energy content.

Digital network compatibility is maintained by transferring all video information via standard asynchronous transfer mode (ATM) packets. The quantity of overhead information required to be sent with each video frame is minimized by using fixed-length codewords for each layer of video information, thus requiring video synchronization information to be sent only once at the beginning of each frame.

Other advantages and features will become apparent from the following description of the preferred embodiments and from the claims.

DESCRIPTION OF THE PREFERRED EMBODIMENTS

We first briefly describe the drawings.

Figure 1:
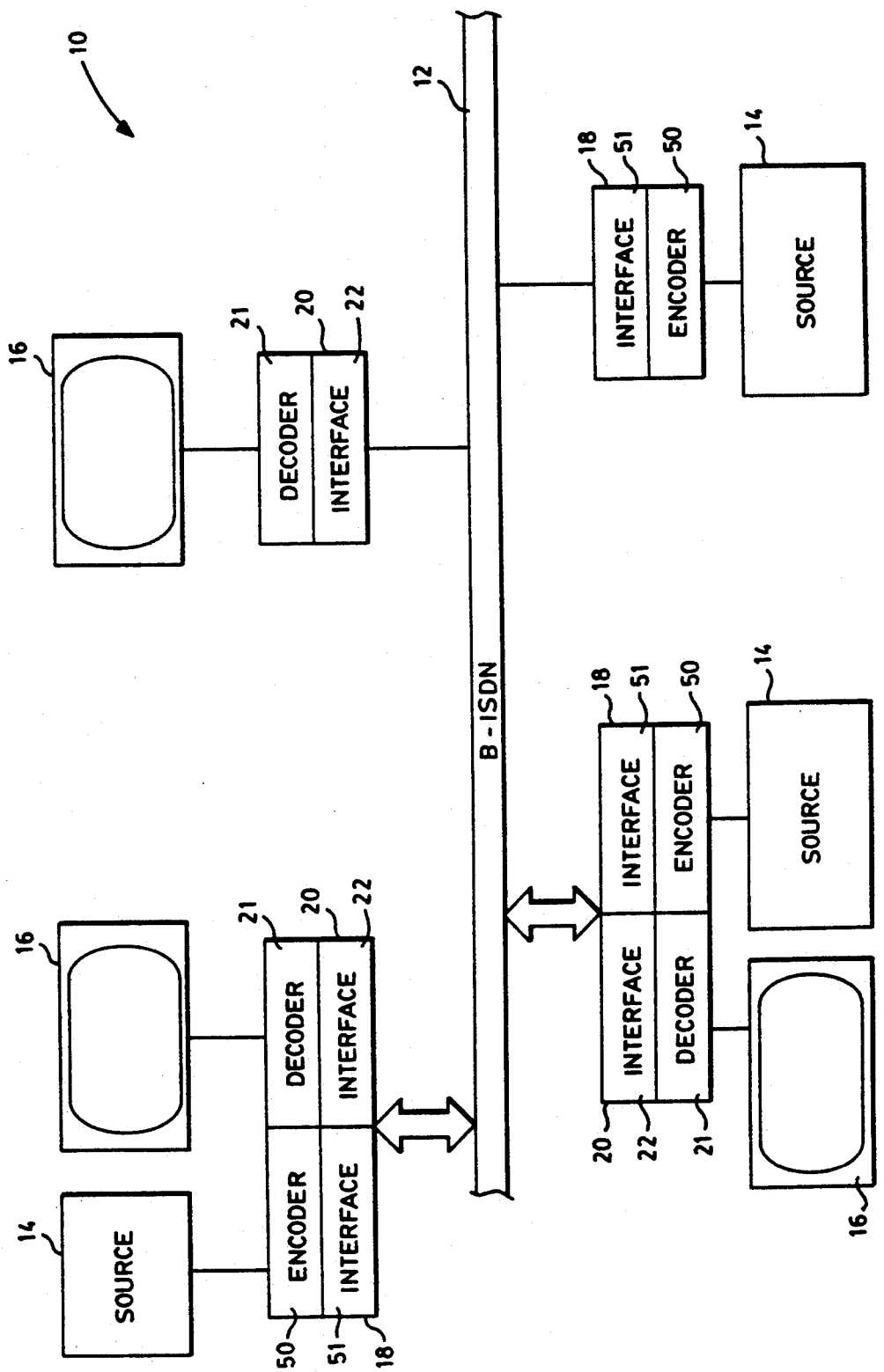
FIG. 1 is a block diagram of a digital communications network using the digital video encoder of this invention.
Figure 2:
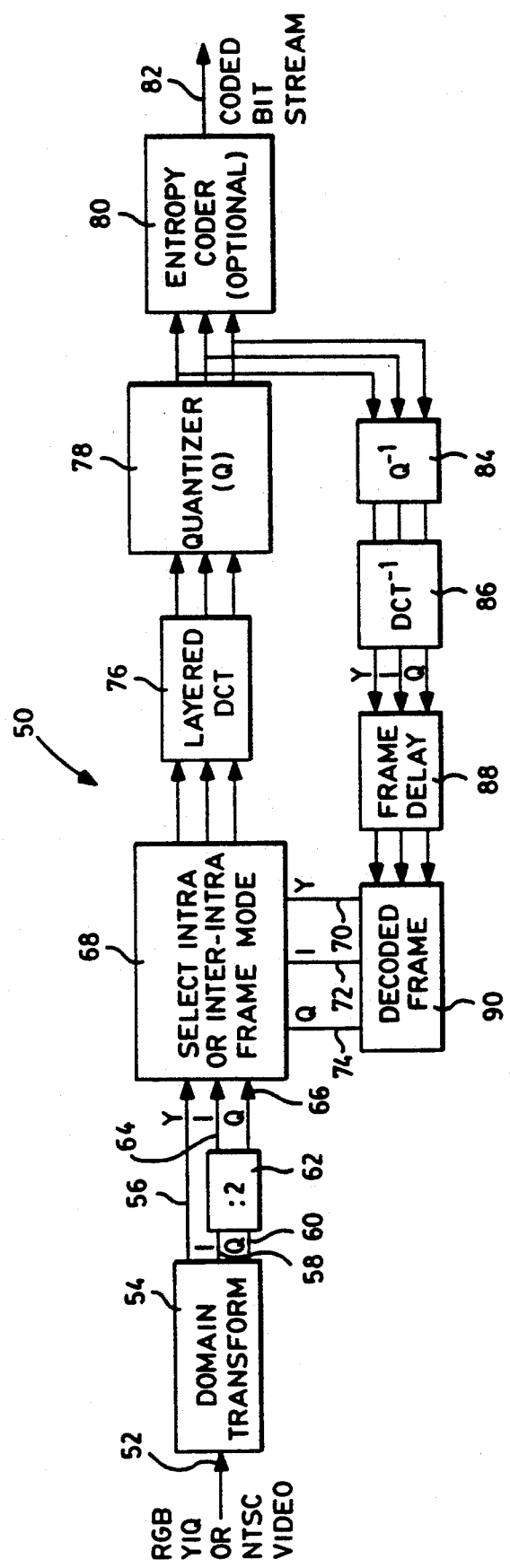
FIG. 2 is a block diagram of a combined intra-frame/inter-frame layered DCT video encoder for encoding a color video frame for transmission over the digital communications network of FIG. 1.
Figure 3:
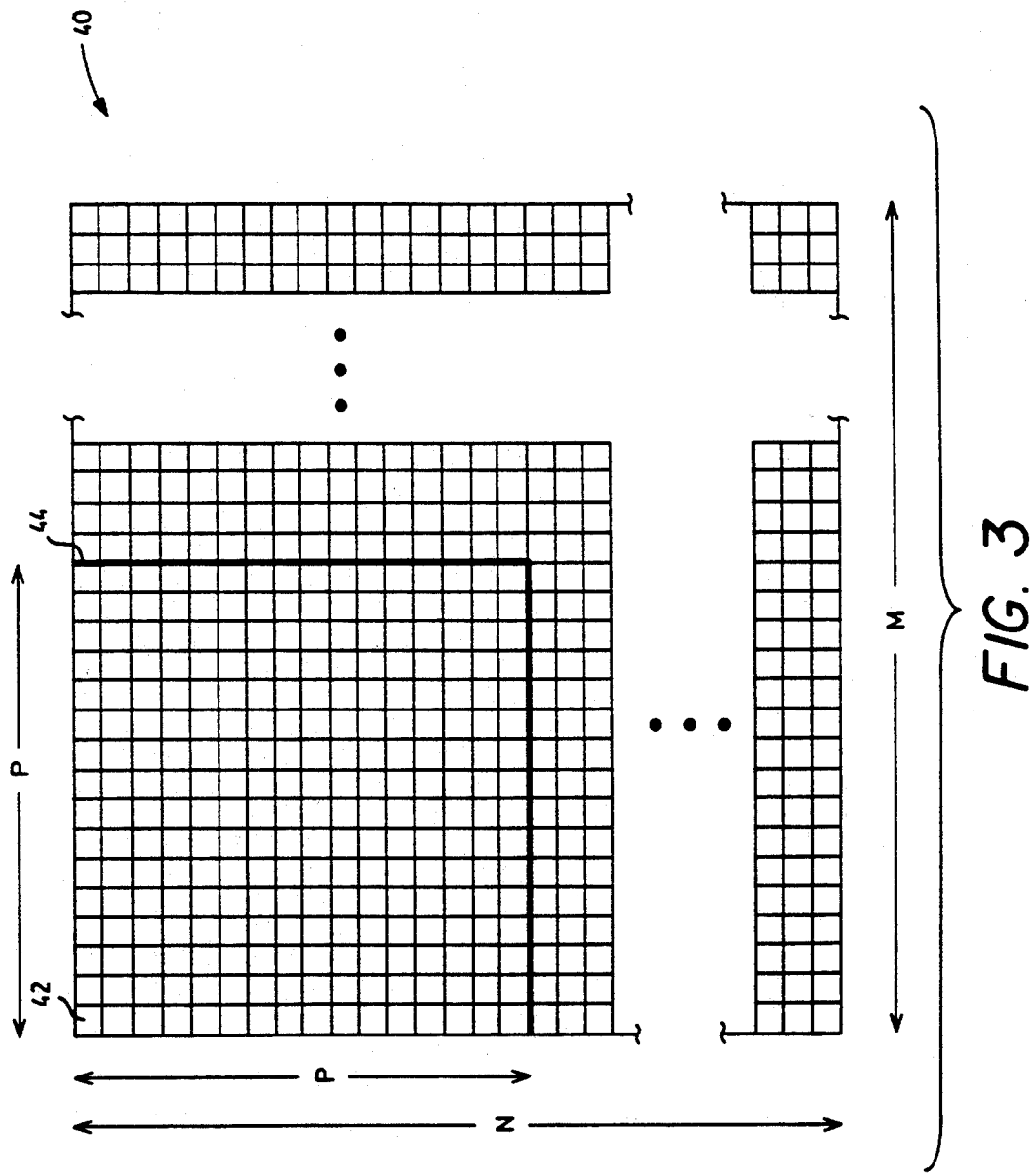
FIG. 3 is a diagram showing a video frame, encoded by the encoder of FIG. 2, divided into pixel elements, and the pixel elements grouped into a pixel block.
Figure 4:
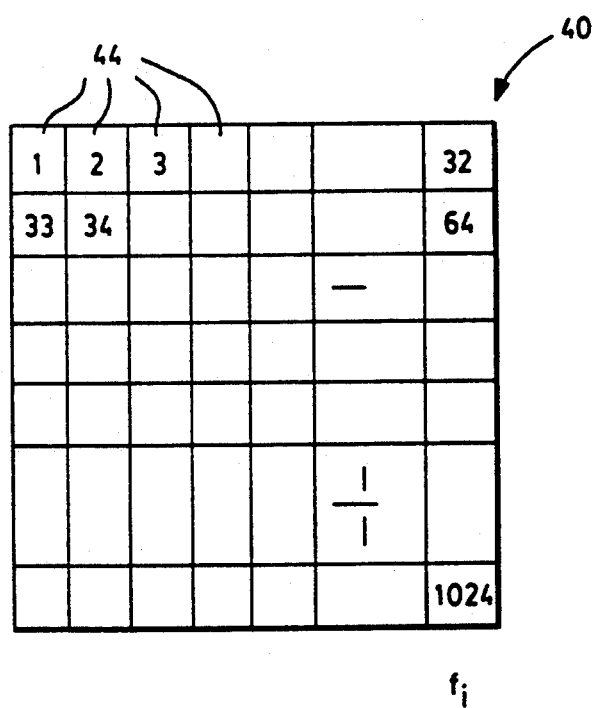
FIG. 4 is a diagram showing the video frame of FIG. 3 divided into pixel blocks.
Figure 5:
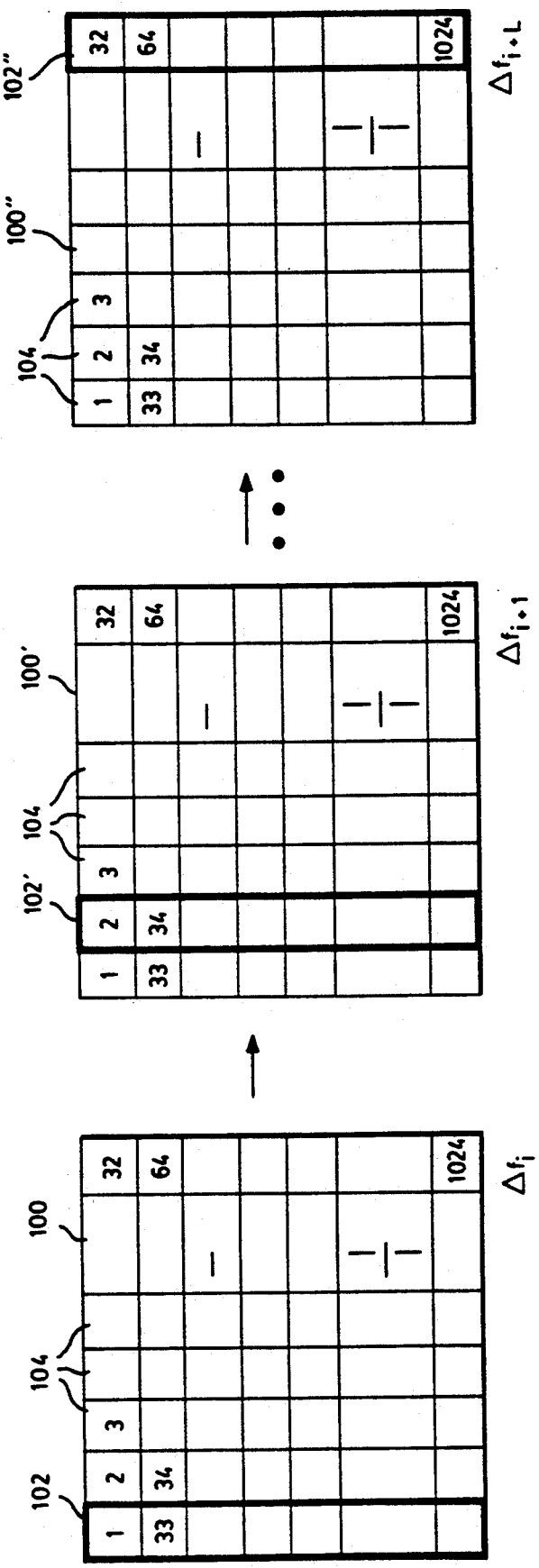
Figure 6:
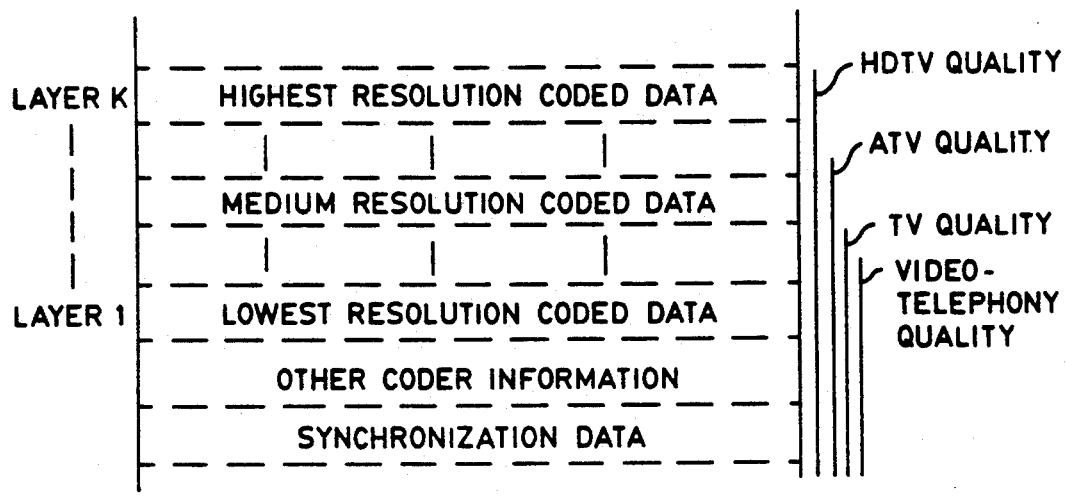
Figure 7:
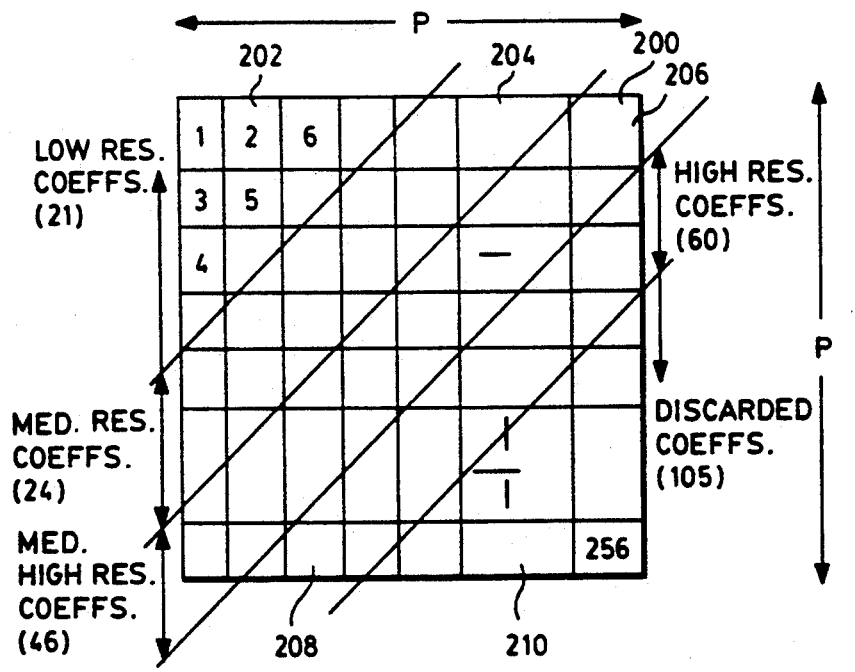
Figure 8:
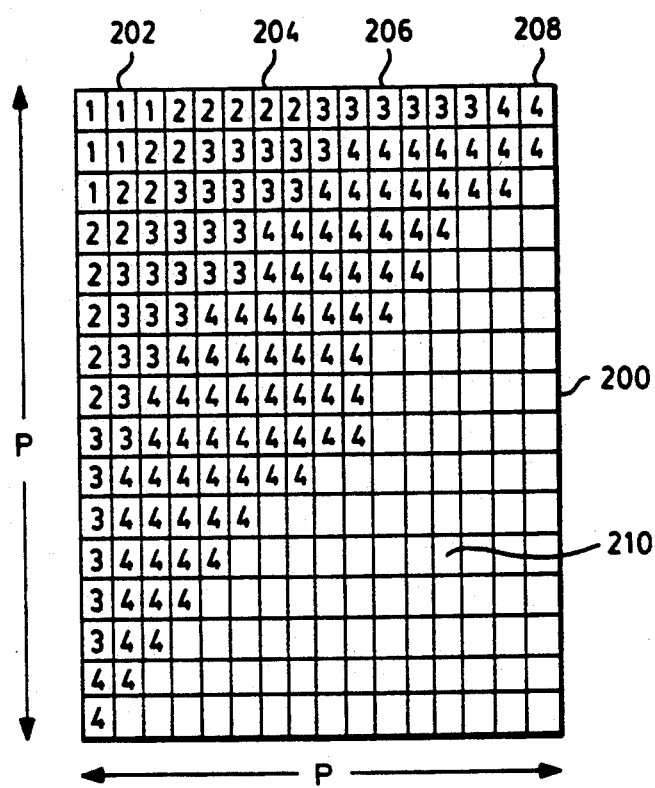
Figure 9:
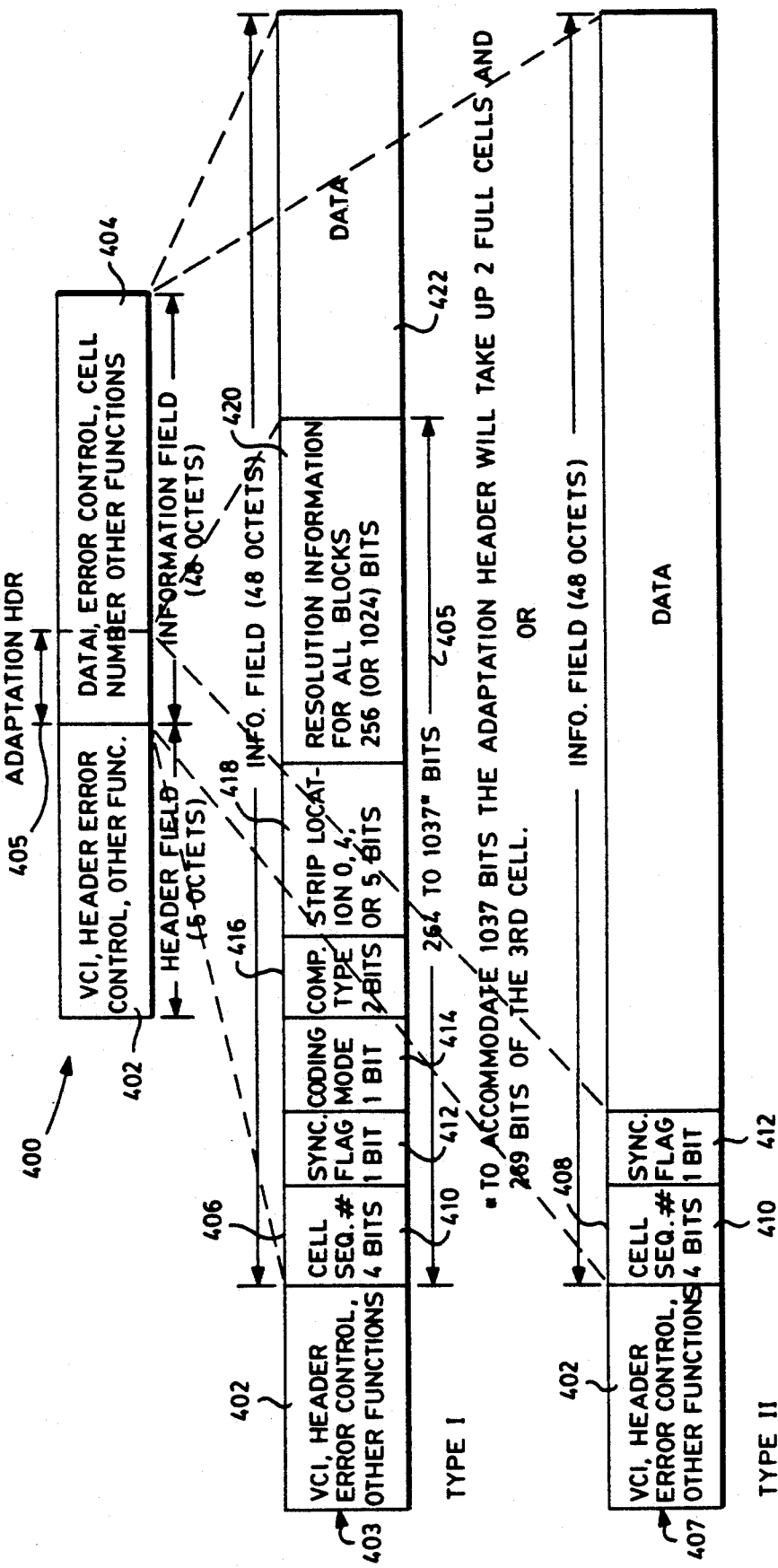

FIGS. 5(a)-5(c) are sequential diagrams showing the changing position of an intra-frame mode encoded strip of pixel blocks moving across inter-frame mode encoded pixel blocks of the video frame of FIG. 4;

FIG. 6 is a diagram showing a layered resolution coding model implemented by the video encoder of FIG. 2;

FIG. 7 is a diagram showing the layout of a DCT coefficient block, corresponding to the pixel block of FIG. 3, for defining the DCT coefficient layers of the layered resolution coding model of FIG. 6;

FIG. 8 is a diagram showing an alternative layering definition for the DCT coefficient block of FIG. 7;

FIG. 9 is a diagram showing asynchronous transfer mode (ATM) cell structures for transferring video frame data, encoded by the video encoder of FIG. 2, across the digital communications network of FIG. 1.

Figure 10A:
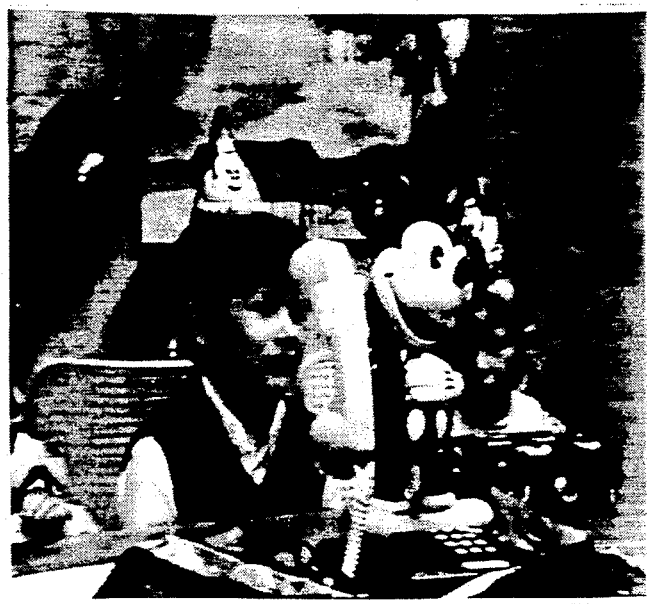
Figure 10B:
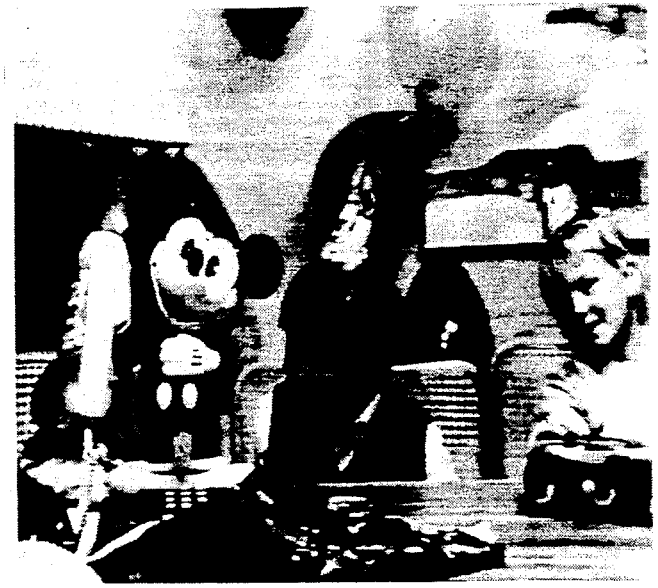
Figure 11A:
Figure 11B:
Figure 11C:
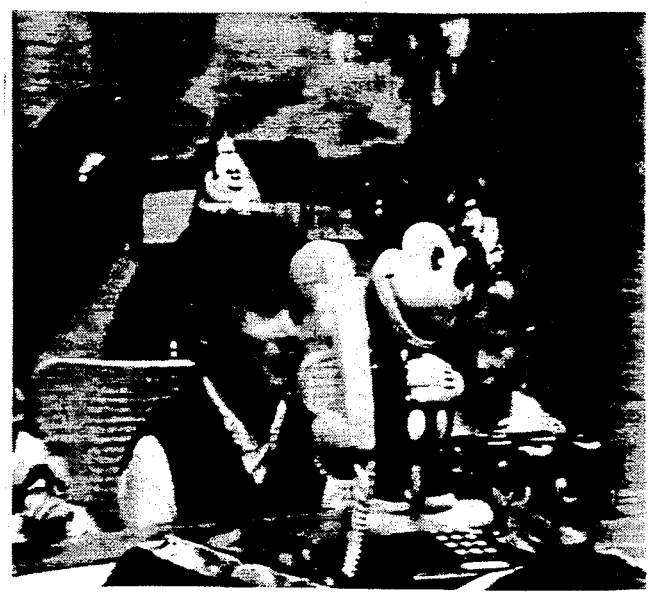
Figure 11D:
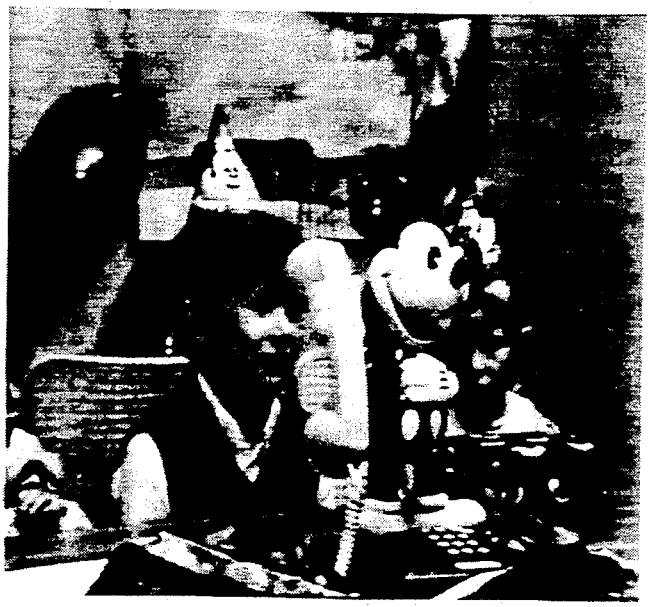
Figure 12A:
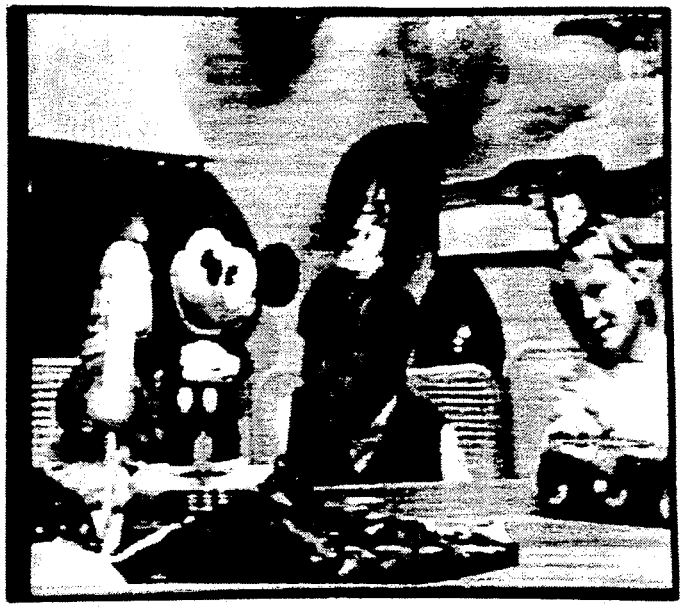
Figure 12B:
Figure 12C:
Figure 12D:

FIGS. 10(a)-10(b) are photographs of an original video image encoded by the video encoder of FIG. 2 using intra-frame mode encoding and composite intra/inter-frame mode encoding, respectively according to this invention;

FIGS. 11(a)-11(d) are photographs of the image of FIG. 10(a) after experimental decoding using various resolution layers;

FIGS. 12(a)-12(d) are photographs of the image of FIG. 10(b) after experimental decoding using various resolution layers;

FIGS. 13(a)-13(d) are photographs of the images of FIGS. 10(a) and 10(b) after experimental decoding simulating various cell loss conditions; and FIGS. 14(a) and 14(b) are tables summarizing experimental performance results obtained with the video encoder of this invention.

Referring now to FIG. 1, a digital communications system 10 capable of transferring digital video information among users includes a broadband ISDN (B-ISDN) protocol network 12, one or more digital video sources 14 each coupled to the network through a compressor 18, and one or more video display devices 16 each coupled to the network through a decompressor 20. Video source 14 produces frames of digital video which are transferred to a compressor 18. Compressor 18 encodes, formats, and transmits each frame of digital video onto network 12 in the form of numerous digital video data packets. Decompressor 20 receives the digital video data packets representing a frame of video data from the network, decodes the packetized data, and reconstructs the data into the original digital video frame. Video display device 16 displays the reconstructed video frames. Some devices on the network may combine a compressor 18 and a decompressor 20 in the same device to facilitate operation in a bi-directional mode, e.g., videoconferencing, videotelephony, etc.. Other devices may require only a compressor or a decompressor and operate in a uni-directional mode, e.g., TV distribution, catalog services, etc..

Compressor 18 includes a video frame encoder 50 connected to network 12 by a network interface 51, and decompressor 20 includes a video decoder 21 connected to network 12 by a network interface 22. Encoder 50 and decoder 21 work together to transfer a frame of digital video from the source to the display using either an intra-frame coding mode, or an inter-frame coding mode (which includes a composite intra/inter-frame coding mode). In the intra-frame coding mode, a frame of digital video is encoded for transmission using only the video information present in that frame. In the inter-frame coding mode, a frame of digital video is encoded using video information present in that frame, as well as video information from previous video frames, usually the frame immediately prior in time to the frame being encoded. In the composite intra/inter-frame coding mode, a frame of digital video is encoded using a combination of the intra-frame and inter-frame coding modes.

FIG. 2 shows a block diagram of a digital video frame encoder 50, according to this invention, for transforming a high-bandwidth color video signal into a coded, compressed, and resolution-layered, digital data bit stream for transmission across network 12 in asynchronous transfer mode (ATM) formatted packets. A standard RGB, YIQ, or NTSC color video signal is applied to the input 52 of domain transformer 54 which transforms each color video frame of any of these input signal types into a digital Y-component video frame on line 56, a digital I-component video frame on line 58 and a digital Q-component video frame on line 60. The I- and Q-component frames are undersampled (or decimated) by a factor of two by sampler 62 to produce reduced resolution I- and Q-component frames on lines 64 and 66, respectively.

An encoder 68 compresses the video data by independently encoding each of the Y-, I-, and Q-component frames on lines 56, 64, and 68, respectively, into either an intra-frame mode coded difference frame or a composite intra/inter-frame mode coded difference frame, depending on the relative motion between successive video frames of the same component type. Encoder 68 automatically selects between the two encoding modes by comparing the present Y-, I-, and Q-component frames on lines 56, 64, and 66, respectively, with the corresponding previous Y-, I- and Q-component frames available on lines 70, 72, and 74.

Each of the Y-, I-, and Q-component encoded difference frames output from encoder 68 is passed through a layered discrete cosine transform (DCT) 76 which separates the video information present in each difference frame into layers of DCT coefficients based upon resolution, ranging from a low-resolution DCT layer containing basic image information, to a high-resolution DCT layer containing detailed image information. A quantizer 78 quantizes the DCT coefficients, representing the low-resolution DCT coefficients with a larger digital word size than the high-resolution DCT coefficients. An entropy coder 80 encodes the quantizer outputs into a coded bit stream 82 suitable for digital packetizing. The quantizer outputs are also used to feed back the previous Y-, I-, and Q-component frame to the encoder 68 on lines 70, 72, and 74, respectively. This is accomplished by passing the quantizer 78 outputs through an inverse quantizer 84, an inverse DCT 86, a frame delay 88, and a frame decoder 90.

Referring to FIG. 3, a frame $f_i$ of digital video 40, where i is the index number of the present video frame, is divided into N horizontal lines (rows) of M (columns) video pixels 42 each, i.e., an M×N two dimensional array of pixels. A pixel block 44 is defined here as being a square grouping of pixels 42 having P pixels on each side, i.e., a P×P two dimensional square array of pixels. It should be noted that the pixel block may be rectangular as well. For convenience, P, M, and N are chosen so that M and N are both integer multiples of P, which produces an integer number of non-overlapping pixel blocks 44 contained in each video frame 40. In the preferred embodiment, N equals 512, M equals 512, and p equals 16. This produces a convenient square frame of digital video having 32 pixel blocks on each side for a total of 1,024 blocks in each frame as shown in FIG. 4. It will be apparent to those skilled in the art that this invention is not restricted to these dimensional parameters, nor to non-overlapping pixel blocks.

A color video image may be efficiently represented by three video frames $f_{Yi}$, $f_{Ii}$ and $f_{Qi}$, respectively representing the familiar Y-, I-, and Q-components of the color video image. Each pixel of $f_{Yi}$ represents only the Y-component for the corresponding full color pixel, each pixel of $f_{Ii}$ represents only the I-component for the corresponding full color pixel, and each pixel of $f_{Qi}$ represents only the Q-component for the corresponding full color pixel. The color video image is reconstructed by inverse transforming video frames $f_{Yi}$, $f_{Ii}$ and $f_{Qi}$ into R-, G-, and B-component frames $f_R$, $f_G$ and $f_B$, respectively, which are then overlaid on each other. Unless otherwise specified, the following references to video frame $f_i$ refer equivalently to each component video frame type $f_{Yi}$, $f_{Ii}$, or $f_{Qi}$ (or $f_R$, $f_G$ or $f_B$).

The Y-component carries the highest bandwidth information about the color image, typically at least four times that of either the I- or Q-component. Therefore, less pixels are required to sufficiently convey the I and Q information, than are required to convey the Y information for the same image. In the preferred embodiment, a single I or Q pixel corresponds to a square block covering an area of four Y pixels. Thus, for an M×N (512×512) pixel color image having a Y-component frame $f_{Yi}$ containing M×N (512×512) pixels, the I-component frame $f_{Ii}$ and Q-component frame $f_{Qi}$ need only contain M/2×N/2 pixels (256×256) each, with each I or Q pixel covering four times the image area of a Y pixel.

Transformation of the I- and Q-components from the 512×512 pixel video frame to the 256×256 pixel video frame is accomplished by subsampling the I- and Q-video components by a factor of two, and replacing blocks of four I or Q pixels with a single pixel containing the average (or some other measure) of the four pixels replaced.

The transmission efficiency of a particular video frame encoding mode depends on the motion characteristic of the video frame being transmitted. A video frame $f_i$ having little or no motion relative to the previous frame $f_{i-1}$ is most efficiently encoded by taking advantage of the temporal redundancy between frames and only sensing information about the difference between these successive frames, i.e., using an inter-frame coding mode. A video frame $f_i$ having significant motion relative to the previous frame $f_{i-1}$ is most efficiently encoded by taking advantage of the spatial redundancy within each frame and sending only information about the frame $f_i$ itself, i.e., using an intra-frame coding mode. Thus, the choice between encoding a video frame $f_i$ with an inter-frame coding mode (i.e., composite intra/inter-frame coding mode) or an intra-frame coding mode depends upon the amount of motion between the previous frame $f_{i-1}$ and the present frame $f_i$, with the coding mode chosen on a frame by frame basis.

To determine whether a video frame $f_i$ is to be encoded with the intra-frame coding mode or the composite intra/inter-frame coding mode, a difference frame $\Delta f_i$ is first computed from the present frame $f_i$ and the previous frame $f_{i-1}$ by taking the difference between the absolute pixel value of corresponding pixels in these two successive frames. Thus, difference frame $\Delta f_i$ consists of difference pixels $\Delta \bar{x}_i(m,n)$ computed by $$\Delta x_i(m,n) = x_i(m,n) - x_{i-1}(m,n) \tag{1}$$

where $x_i(m,n)$ and $x_{i-1}(m,n)$ represents the absolute pixel value at location (m,n) in frames $f_i$ and $f_{i-1}$, respectively, and $(m,n) = (1,1), \ldots, (M,N)$ in an M×N pixel frame. Now, using J random locations in the difference frame $\Delta f_i$, an estimate of the mean difference pixel value $\Delta \bar{x}_i$ is computed by $$\Delta \bar{x}_i = \sum_{j=1}^{J} \Delta x_i(j)/J \tag{2}$$

and, an estimate of the variance is computed by $$\sigma^2 = \sum_{j=1}^{J} (\Delta x_i(j) - \Delta \bar{x}_i)^2 / J \tag{3}$$

where $\Delta x_i(j)$ is a short notation for the J randomly selected pixels $\Delta x_i(m,n)$.

Next, a decision parameter K, chosen to be one measure of the amount of motion between frames $f_{i-1}$ and $f_i$, is computed from the mean $\overline{\Delta x_i}$ and variance $\sigma^2$ of the difference pixels $\Delta x_i(m,n)$ by $$K = k_1 \overline{\Delta x_i} + k_2 \sigma \qquad (4)$$

where k1 and k2 are weighting coefficients each having a value between 0 and 1 such that $k_1 + k_2 = 1$. A threshold parameter T is chosen such that for K < T, an inter-frame coding mode is selected, and for K ≥ T, an intra-frame coding mode is selected. Variance $\sigma^2$ is an important parameter in measuring relative motion for determining coding mode because the mean $\overline{\Delta x_i}$ is often close to zero and the variance always yields a positive value.

The sensitivity of the overall video quality to cell loss and data corruption depends to a large extent on the percentage of video frames encoded with each of the coding modes, i.e., inter-frame mode encoded video frames are more sensitive to cell loss and data corruption than intra-frame mode encoded frames because errors propagate through reconstructed inter-frame mode encoded frames. Independent selection of the threshold parameter T allows flexibility in adjusting the encoding percentages, and thereby the system performance.

If the decision is to encode a video frame $f_i$ in the intra-frame mode, an intra-frame mode coded difference frame $\Delta f_i$ is generated. A preferred method for generating an intra-frame coded difference frame $\Delta f_i$ requires dividing the video frame $f_i$ into vertical strips of equal width, and applying a previous pixel predictor independently within each strip to generate difference pixels $\Delta x_i(m,n)$ from the video frame pixels $x_i(m,n)$ within the strip. Each difference pixel $\Delta x_i(m,n)$ of pixel frame $\Delta f_i$ represents the difference between the actual pixel value $x_i(m,n)$ and a corresponding predicted pixel value $x_i^P(m,n)$, where the predicted pixel value is the actual value of the previous pixel along the same $n^{th}$ line of pixels within the same pixel strip. Mathematically, this is given by $$X_i^P(m,n) = x_i(m-1,n) \qquad (5)$$

and, $$\Delta x_i(m,n) = x_i(m,n) - x_i^P(m,n) \qquad (6)$$

Thus, the proper reconstruction of each pixel along the same line within a strip depends on the proper reconstruction of the previous pixel along that line. Applying a new predictor within each strip effectively limits the propagation of decoded errors along a line to the strip itself.

Another preferred method for generating an intra-frame mode coded difference frame $\Delta f_i$ requires first dividing the present video frame $f_i$ into P×P pixel blocks. The average value of each pixel block is then determined and subtracted from each pixel within the corresponding block, thereby producing a difference frame $\Delta f_i$. Each block average is DPCM coded and transmitted with its corresponding pixel block information so that video frame $f_i$ may be reconstructed from $\Delta f_i$ at the receiver. Yet another preferred method of producing a difference frame $\Delta f_i$ is to use the boundary pixels of the previously decoded blocks to estimate the average pixel value of the next pixel block to be decoded, thus avoiding the need to transmit the average pixel value for each pixel block.

Referring to FIG. 5(a), a composite intra/inter-frame mode coded difference frame $\Delta f_i$ 100 is generated by combining inter-frame coded pixel blocks 104, making up a majority of the pixel blocks in the frame, with a portion 102 of intra-frame coded pixel blocks 106. In the preferred embodiment, portion 102 is a vertical strip having a column width equivalent to the block width (i.e., P pixels), or multiple block widths. The geometry of portion 102 is not critical and may vary from one embodiment to another, e.g., portion 102 may take the form of a horizontal strip, a diagonal strip, multiple strips, or randomly selected blocks. Thus, portion 102 of video difference frame $\Delta f_i$ contains only intra-frame mode encoded pixel blocks 106, and the remainder of the difference frame $\Delta f_i$ outside portion 102 contains only inter-frame coded pixel blocks 104.

The intra-frame mode coded blocks 106 of portion 102 are encoded using one of the intra-frame mode encoders discussed above, and are encoded independent of any data from another frame or data from the pixel blocks outside the boundary of portion 102. Thus, intra/inter-frame mode encoded data contains all the data necessary to reconstruct the pixel blocks 106 of portion 102 without knowledge of previous frame data, and all the data necessary to reconstruct the pixel blocks 104 outside portion 102 with knowledge of previous frame data.

Referring now also to FIGS. 5(b) and 5(c), vertical strip portion 102, defining the boundary of intra-frame mode encoded pixel blocks within difference frame $\Delta f_i$ 100, is advanced to the right in a sequential and non-overlapping manner every time a new frame is encoded using the composite intra/inter-frame mode encoding. Starting from the leftmost edge of the difference frame $\Delta f_i$ 100 shown in FIG. 5(a), vertical strip portion 102 is advanced one block column (i.e., P pixels) to the right after one frame time to define a new vertical strip portion 102' at the position shown in difference frame $\Delta f_{i+1}$ 100' of FIG. 5(b). FIG. 5(c) shows the vertical strip portion 102'' positioned at the rightmost block column of difference frame $\Delta f_{i+L}$ 100'' L frame periods after the first difference frame $\Delta f_i$, where L = (M/P) − 1. After L frame periods, the cycle repeats itself. Thus, as shown in FIGS. 5(a), 5(b) and 5(c), in a video sequence whose frame resolution is 512×512 pixels (i.e., M = N = 512 for $\Delta f_{Yi}$), having a pixel block width P = 16 pixels, and a vertical strip portion 102 having a single pixel block width (i.e., L = 32), the entire video frame is refreshed with intra-frame coded video data every 32 frame periods provided all the frames are coded using the composite intra/inter-frame coding mode. In the case of $\Delta f_{Ii}$ and $\Delta f_{Qi}$, whose frame resolution is 256×256 pixels, L = 16, and the entire video frame is refreshed every 16 frame periods.

Referring to FIG. 6, a resolution-layered encoding technique for transmitting an intra-frame, or intra/inter-frame, encoded video difference frame $\Delta f_i$ across the network 12 (FIG. 1), from a source network interface 18 (FIG. 1) to a display network interface 20 (FIG. 1), separates the digital video data into layers based on the video resolution information present in the data. In layered coding, the digital video information is divided into several layers, with the lower layers containing low resolution information, and the higher layers containing higher resolution information. The layers are priority ordered in descending order of importance to image reconstruction, with the lower resolution layers, which carry the most important basic picture information, having a higher priority than the higher resolution layers, which carry the less important fine detail picture information.

Such a layered coding model allows integration of video telephony, broadcast-quality video, and high-quality high definition video (HDTV/ATV) services. For instance, a video frame encoded using the layering model shown in FIG. 6 has K layers of coded data, with layer 1 containing the lowest resolution data, and layer K containing the highest resolution data. Video telephony service only requires the data from the lowest resolution layers, perhaps only layer 1. Broadcast-quality video service requires the data from low and medium resolution layers. HDTV service requires the data from all resolution layers 1 through K. A video frame encoded with all K layers may be reconstructed by all the video services, with each service using only the data layers it requires to reconstruct a full quality video image for that service. Analogously, a video service need only generate, transmit and receive the number of layers required for that service. Thus, in particular video services where bandwidth is at a premium, the lower layers can provide the video quality required by the service at a video data bit rate that is compatible with the video service receivers.

Referring to FIG. 7, each P×P pixel block 104 or 106 (FIG. 5) of the digital video difference frame $\Delta f_i$ 100 (FIG. 5) is layer coded by first applying a discrete cosine transform (DCT) algorithm to the video data in the pixel block 104 or 106 to produce a corresponding P×P block of DCT coefficients 200 (FIG. 7). The DCT coefficient block 200 includes subsets 202, 204, 206, 208 and 210 of coefficients which correspond respectively to the low, medium, medium-high, high and very-high resolution video data present in the pixel block. The layered coding model of FIG. 6 is implemented by assigning each subset of DCT coefficients to the data layer corresponding to the resolution appropriate for the DCT coefficients in the subset.

In a preferred embodiment shown in FIG. 7, where P=16, i.e., DCT coefficient block 200 is a 16×16 block with 256 DCT coefficients, the low (layer 1), medium (layer 2), medium-high (layer 3) and high resolution (layer 4) layers respectively contain the 21 DCT coefficients of subset 202, the 24 coefficients of subset 204, the 46 coefficients of subset 206, and the 60 coefficients of subset 208. The remaining 105 DCT coefficients of subset 210 contain very-high resolution information, typically contain relatively little energy, and may be discarded without substantially affecting the image quality of the highest resolution video modes supported by the network. Although FIG. 7 shows DCT coefficient block 200 divided into parallel looking, well-structured coefficient layers (i.e., DCT coefficient subsets each corresponding to a different data layer) it is feasible to define coefficient layers in any shape and size by individually assigning each DCT coefficient into any layer. For instance, FIG. 8 shows another 16×16 DCT coefficient block having coefficient layers defined by assigning each DCT coefficient to a specific layer, with the numeral indicating which layer each DCT coefficient is assigned to. DCT coefficient assignments remain fixed for the duration of the coding.

Referring again to FIG. 7, the DCT coefficient layers are transmitted over the network in a manner that enables progressively improving reconstruction of decoded video frames at the receiver. For example, the low resolution, layer 1, DCT coefficients of subset 202 corresponding to all the pixel blocks 104, 106 of the digital video difference frame $\Delta f_i$ 100 (FIG. 5) are transmitted first, followed by the medium resolution, layer 2, coefficients of subset 204 corresponding to all the pixel blocks, and so on. The receiver reconstructs the digital video difference frame $\Delta f_i$ by first using the low resolution, layer 1, DCT coefficients of subset 202 to supply the basic elements of the image, and later adding detail to the image with the higher resolution DCT coefficient layers subsequently received.

Each coefficient subset of the DCT coefficient block 200 of FIG. 7 may be accessed by zig-zag scanning the DCT coefficient block starting in the uppermost left-hand corner, i.e., following the sequence 1, 2, 3, 4, 5, 6, etc. shown in FIG. 7. First the low resolution, layer 1, DCT coefficients of subset 202 are scanned, then the medium resolution, layer 2, coefficients of subset 204, the medium-high resolution, layer 3, coefficients of subset 206, and finally the high resolution, layer 4, coefficients of subset 208. The very-high resolution coefficients of subset 210 are discarded.

Transmission priority, to a large part, is determined by the relative importance of the transmitted information to reconstructing the video image at the receiver. The low resolution, layer 1, coefficients are given the highest priority among the data layers since this layer typically contains the highest energy DCT coefficients which correspond to the basic picture elements. Without proper reconstruction of the basic picture elements conveyed by the layer 1 data, the information conveyed by the other data layers may be meaningless to image reconstruction. The low resolution, layer 1, coefficients are transmitted first, followed by the medium resolution, layer 2, coefficients, the medium-high resolution, layer 3, coefficients, and then the high resolution, layer 4, coefficients. Thus, different network data transmission priority levels can be assigned data from different layers, with the highest priority assigned to lowest resolution coefficient layer and synchronization overhead information, and the lowest priority to the highest resolution coefficient layer, such that in the event of network congestion, low priority cells can be discarded without seriously affecting the video quality at the receiver.

Data compression of the video information is enhanced by discarding information of little or no consequence to the video quality, e.g., the low energy very-high resolution DCT coefficients of subset 210. Furthermore, if the total energy content of any DCT coefficient layer is small, that layer, and the layers above it, may also be discarded and not transmitted. Discarding multiple layers of DCT coefficients with little or no image degradation results in significant data bandwidth savings for each frame of video data transmitted across the network.

Referring to FIG. 9, an Asynchronous Transfer Mode (ATM) data packet structure, or cell, 400 for transferring packets of digital information over network 12 (FIG. 1) includes a header field 402 and an information field 404. The header field 402 typically includes, among other data, network level routing information (i.e., virtual channel identifiers, or VCIs) used to establish a virtual channel between devices across the network. Information field 404 typically includes the data to be transferred between devices. Information field 404 also typically includes an adaptation overhead sub-field 405 which carries information related to the protocol with which the data in the remainder of information field 404 is encoded.

Two types of ATM digital video cell structures 403 (Type I) and 407 (Type II), corresponding to ATM cell structure 400, are used for transmitting a digital video difference frame $\Delta f_i$ across the network. (It is assumed that the frame resolution of $\Delta f_{Yi}$ is 512×512 pixels, having 1024 16×16 pixel/coefficient blocks, and that the frame resolution of $\Delta f_{Ii}$ and $\Delta f_{Qi}$ each are 256×256 pixels, having 256 16×16 pixel/coefficient blocks.) Type I and Type II cell structures have the same header field structure 402, but have different information field structures 404, with the Type I cell information field taking the form of information field structure 406, and Type II cell information field taking the form of information field structure 408. Both information field structures 406 and 408 have a first subfield 410 defining a cell sequence number indicating the relative position of the current cell with respect to other transmitted cells. Both information field structures 406 and 408 also have a second subfield 412 defining a sync flag whose state determines the characteristics of the remainder of the information field. If the sync flag is set (logic high) then the cell is of Type I and information field structure 406 defines the remainder of the field, and if the sync flag is clear (logic low) then the cell is of Type II and information field structure 408 defines the remainder of the field.

Type I cells 403 carry frame sync and code specific information in the adaptation overhead section 405 (shown by the dashed lines extending from ATM cell structure 400) of its information field 406. An adaptation overhead section 405 may be larger than information field 406 of a single Type I cell, in which case the adaptation overhead is distributed across as many Type I cells as required. Type I cells carrying adaptation overhead section 405 are sent only once at the beginning of each new video frame.

Type II cells carry the remainder of the video frame information, i.e., DCT coefficients, packed into the information fields 408 of as many Type II cells as required. Fixed length code words are used for the DCT coefficients of each layer within each block and therefore no spatial (timing) synchronization information needs to be included in the information field 408 overhead.

Referring to the adaptation overhead section 405 of Type I cell information field 406, the adaptation overhead section includes a coding-mode subfield 414, a component-type subfield 416, a vertical-strip-location subfield 418, and resolution information subfield 420. A DCT coefficient data subfield 422, outside adaptation overhead section 405, makes up the remainder of information field 406 when the quantity of adaptation overhead data is smaller than the size of information field 406. More specifically, coding-mode subfield 414 typically contains a single bit which identifies which of the encoding modes was used to encode the video frame, i.e., either the intra-frame or composite intra/inter-frame encoding mode. Component-type subfield 416 typically contains 2 bits which identify the video color component type to which the current video frame data corresponds, i.e., the Y, I, or Q-video component frame. Vertical-strip-location subfield 418 typically contains 0, 4, or 5 bits which identify the block column location of the vertical strip portion 102 (FIG. 5) of intra-frame coded data for a composite intra/inter-frame coded video frame. Resolution information subfield 420 contains data that indicates how many layers of DCT coefficients have been included for each pixel block of the video frame, i.e., the resolution of each pixel block.

By allocating more bits to resolution information subfield 420, it is possible to specify which coefficient layers have been kept and transmitted, and which layers have been discarded, on a per block basis. The more specific the information is about which layers are being transmitted, the higher the data compression becomes. For instance, 256 bits may be allocated to the resolution information subfield for an I- or Q-component frame, with a single bit representing each pixel block's resolution, i.e., one bit corresponding to each of the 256 pixel blocks. In this case, the single bit per block may represent whether there is sufficient information present in any coefficient layer of the corresponding block, and thereby whether any coefficients for that block will be transmitted. If there is little or no information in the block, then the entire block is discarded. If there is sufficient information in any coefficient layer in the block, then all four coefficient layers of the block are transmitted. Similarly, where 1,024 bits are allocated to the resolution information subfield, the same quantity of resolution information is available for each pixel block of a Y-component frame, i.e., one bit corresponding to each of the 1,024 blocks.

For these resolution information subfield structures, more than a single Type I cell would typically be required to carry the Y-component sync information (1,024 bits), whereas a single Type I cell would typically be able to carry all of either the I- or Q-component sync information (256 bits). It is expected that the Type I cells which carry the overhead information would be transmitted at the highest network priority to avoid any cell loss, and it is assumed that the cells will never be lost. If robustness to sync cell loss is also desired, it would be necessary to remove the field which carries the resolution information for all blocks and send all the layers (up to the highest desired resolution) of all the blocks.

The above structures can be further simplified, and compression enhanced, by keeping the resolution information subfield size of I- and Q-components the same as that for the Y-component. For instance, allocating a 1,024 bit resolution information subfield for I- and Q-components increases the resolution information from a one bit to four bits corresponding to each pixel block. Four bits per block can readily convey which of the four DCT coefficient layers from each corresponding block has not been coded because of insufficient energy content. (However, 4,096 bits are required to convey the same quantity of resolution information about the Y-component frame as now being conveyed about the I- and Q-component frames). Thus, only those layers with sufficient energy content are selectively transmitted, which enables individual specification of whether to drop or keep each layer in each block. Although overhead apparently increases, there is a significant reduction in the total number of coded bits generated on a per frame basis, resulting in higher compression efficiency.

A fixed number of bits may be assigned to the coefficients of each layer, which may then be entropy encoded to further increase the compression. However, employing variable codeword entropy coding would adversely impact the resynchronization of video in the event of cell loss unless resynchronization flags are inserted in the cell adaptation overhead, which may then consist of such information as the cell sequence number, the color component, the line number, and the location of the first complete code word in the cell information field and its spatial location in the frame. A number of possibilities exist for the exact adaptation overhead structure.

Experimental Results

Referring to FIGS. 10(a) and 10(b), experiments simulating cell loss scenarios and reduced resolution reconstruction were performed on a multi-frame video sequence comprising 512×512 pixel Y-component video frames. FIGS. 10(a) and 10(b) are original frames from the multi-frame sequence chosen by the encoding selector of this invention for encoding using the intra-frame coding mode and the composite intra/inter-frame coding mode, respectively. In the experiments, the encoding selector weighting coefficients $k_1$, $k_2$, and threshold parameter T were chosen to be 0.2, 0.8, and 64 respectively. These coefficient and parameter values are subject to further optimization through additional tests on a variety of video sequences. In all the experimental images presented herein, a DCT coefficient block size of 16×16 was chosen, four DCT coefficient layers were defined as shown in FIG. 7, and 6, 5, 4, and 3 bits were assigned to represent each DCT coefficient of layers 1, 2, 3, and 4, respectively. In all the results shown pertaining to the composite intra/inter-frame coding mode, the intra-frame vertical strip portion 102 of FIG. 5 was chosen to have a 16 pixel width and was positioned in the middle of the video frame.

Referring to FIGS. 11(a)-11(d), the intra-frame mode coded video frame of FIG. 10(a) was decoded using each of four resolution specifications respectively defined as: (a) low resolution, decoding only layer 1 coefficients; (b) medium resolution, decoding layers 1 and 2 coefficients; (c) medium-high resolution, decoding layers 1, 2, and 3 coefficients; and (d) high resolution, decoding layers 1, 2, 3, and 4 coefficients. Similarly, FIGS. 12(a)-12(d) show the intra/inter-frame mode coded video frame of FIG. 10(b) decoded using each of these four resolution specifications, respectively. In either case, no cells were lost during transmission.

Figure 13A:
Figure 13B:
Figure 13C:

Referring to FIGS. 13(a)-13(d), there is shown the effect of losing 5% of the transmitted cells (51 blocks selected at random), simulating an extreme cell loss condition, within various coefficient layers for the intra-frame mode coded image of FIG. 10(a) and the intra/inter-frame mode coded image of FIG. 10(b). FIG. 13(a) shows the effect on the intra-frame mode coded image when the lost cells correspond to coefficient layers other than the lowest resolution layer, layer 1. FIG. 13(c) shows the effect on the intra/inter-frame mode coded image experiencing the same type of cell loss as that of FIG. 13(a).

Figure 13D:

As a simulated "worst case" scenario, FIG. 13(b) shows the effect on the intra-frame mode coded image when the lost cells correspond to the lowest resolution coefficient layer, layer 1. FIG. 13(d) shows the effect on the intra/inter-frame mode coded image experiencing the same type of low resolution layer cell loss as that of FIG. 13(b). This type of layer 1 cell loss simulates a "worst case" since the layer 1 coefficients are typically sent across the network with the highest network transmission priority, and are therefore seldom lost. Further, since each cell typically carries a 3 or 4 bit cell sequence number, the loss of cells is easily determined. Once the loss of a cell is determined, other error concealment techniques, e.g., pixel replication from the previous frame, or pixel interpolation from the present frame, etc., can be employed to reduce the detrimental effect of the cell loss on the reconstructed video frame.

Referring to FIG. 14, Tables I and II show the signal-to-noise ratio (S/N) and bit rates (bpp) calculated for the intra-frame mode encoded image of FIG. 10(a) and the composite intra/inter-frame mode encoded image of FIG. 10(b), respectively, for each of the four resolution specifications defined above, with and without cell loss. Cell loss was simulated by random block loss as described above. An assumed overall cell loss rate of $1\times10^{-9}$ was used for the calculations, and was applied uniformly across all coefficient layers notwithstanding assumed transmission priority differences among the different layers. For a cell size of 53 octets with 48 information octets (proposed ATM B-ISDN standard), and a 512×512 pixel video frame having a 16×16 DCT coefficient block size, an average of about $1\times10^{-5}$ cells, corresponding to $1\times10^{-6}$ blocks, would be lost per frame. This translates to about one block in 1000 frames, which is a much lower rate of loss than the 5% block loss of the cases studied. Further, it is very unlikely that cells corresponding to all coefficient layers of the same block will be lost, which implies that the actual qualitative and quantitative results achieved on the network will be significantly better than the experimental results shown here. Thus, the robustness of the invention to a wide range of cell loss rates is significant.

Another observation that may be made from the experimental results presented here is that as long as low-resolution layer 1 is present, there is negligible image quality loss in either the intra-frame or intra/inter-frame mode coded images. Furthermore, in a motion video sequence, such defects will not typically be visible unless the sequence consists of a stationary scene. Experimental results indicate that coding rates in the range of 0.4 to 2.25 bpp at S/N ratios in the range of 30 to 50 dB are easily obtained, and these figures vary from frame-to-frame and sequence-to-sequence.

Other embodiments are within the scope of the following claims.

I claim:

1. An apparatus for encoding a digital video frame $f_i$, having a matrix with N rows and M columns of pixels $\Delta x_i(n,m)$, for transmission over a digital communications channel, comprising an inter-frame encoder for encoding a said pixel $x_i(n,m)$ of said video frame $f_i$ into a corresponding differentially encoded pixel $\Delta x_i(n,m)=x_i(n,m)-x_i(n,m)$ of a difference frame $\Delta f_i$ dependent on the corresponding pixel $x_{i-1}(n,m)$ of a previous video frame $f_{i-1}$, an intra-frame encoder for encoding a said pixel $x_i(n,m)$ of frame $f_i$ into a corresponding differentially encoded pixel $\Delta x_i(n,m)$ of said difference frame $\Delta f_i(n,m)$ dependent on other said pixels of the same said video frame $f_i$, and an encoding selector for selecting between said inter-frame encoder and said intra-frame encoder for differentially encoding pixels $x_i(n,m)$ of frame $f_i$ into corresponding differentially encoded pixels $\Delta x_i(n,m)$ of said difference frame $\Delta f_i$, said encoding selector being responsive to the relative motion between said video frame $f_i$ and said previous video frame $f_{i-1}$, said coding selector further including a motion detector for detecting the relative motion between said video frame $f_i$ and said previous vide frame $f_{i-1}$, and for providing a decision parameter K representing the level of detected relative motion, K being computed by $$K = k_1 \overline{\Delta x_i} + k_2 \sigma$$

where $\overline{\Delta x_i}$ and $\sigma^2$ are an estimate of the mean and variance, respectively, of difference pixel value $\Delta x_i(n,m)$, k1 and k2 are weighing coefficients each having a value between 0 and 1 such that $k_1 + k_2 = 1$, a layered resolution encoder for encoding said differential pixels $\Delta x_i(n,m)$ of frame $\Delta f_i$ into a plurality of separable data sets, each said data set representing video information, within a particular range of video image resolution, about said differential pixels $\Delta x_i(n,m)$, a packetizer for formatting said plurality of data sets, into at least one asynchronous transfer mode (ATM) packet for transmission over the digital communications channel, said ATM packet comprising a header field portion having data for establishing a virtual communications channel between selected devices on the digital communications channel, and an information field portion for transferring said plurality of data sets between said selected devices, wherein said encoding selector responds to decision parameter K by selecting said inter-frame encoder when K<T and by selecting said intra-frame encoder when K≧T, where T represents a threshold parameter T having a value between 0 and 1.

2. The apparatus of claim 1, wherein said estimate of means difference pixel value $\overline{\Delta x_i}$ is computed by $$\overline{\Delta x_i} = \sum_{j=1}^{J} \Delta x_i(j)/J$$

and, said estimate of means difference pixel variance $\sigma^2$ is computed by $$\sigma^2 = \sum_{j=1}^{J} (\Delta x_i(j) - \overline{\Delta x_i})^2/J$$

where $\Delta x_i(j)$ is a short notation for J randomly selected pixels $\Delta x_i(m,n)$ of difference frame $\Delta f_i$.

3. The apparatus of claim 1 wherein said encoding selector comprises
 a composite frame combiner for providing a differentially encoded difference frame $\Delta f_i$ having a first set of difference pixels $\Delta x_i(m,n)$ encoded by said inter-frame encoder, and a second set of pixels $\Delta x_i(m,n)$ encoded by said intra-frame encoder.

4. The apparatus of claim 3 wherein said second set of pixels $\Delta x_i(m,n)$ comprises
 at least one square pixel block having P pixels $\Delta x_i(m,n)$ on each side, where N/P, and M/P are integer values.

5. The apparatus of claim 4 wherein said second set of pixels $\Delta x_i(m,n)$ comprises
 a vertical strip portion having a width of P pixels and a length of N pixels such that said vertical strip portion comprises a quantity N/P of said pixel blocks arranged vertically aligned and non-overlapping.

6. The apparatus of claim 5 wherein
 said vertical strip portion of said second set of pixels $\Delta x_{i+1}(m,n)$ of frame $f_{i+1}$ is offset horizontally in position from said vertical strip portion of said second set of pixels $\Delta x_i(m,n)$ of frame $f_i$ by at least P said pixels.

7. The apparatus of claim 4 wherein said second set of pixels $\Delta x_i(m,n)$ comprises
 a horizontal strip portion having a width of M pixels and a length of P pixels such that said horizontal strip portion comprises a quantity M/P of said pixel blocks arranged horizontally aligned and non-overlapping.

8. The apparatus of claim 7 wherein
 said horizontal strip portion of said second set of pixels $\Delta x_{i+1}(m,n)$ of frame $f_{i+1}$ is offset vertically in position from said horizontal strip portion of said second set of pixels $\Delta x_i(m,n)$ of frame $f_i$ by at least P said pixels.

9. The apparatus of claim 1 wherein
 said layered resolution encoder comprises a discrete cosine transform (DCT) for transforming said differential pixels $\Delta x_i(n,m)$ into a plurality of DCT coefficients representing said differential pixels, said DCT coefficients separable into said plurality of said data sets providing coefficient layers.

10. The apparatus of claim 9 wherein
 said difference frame $\Delta f_i$ comprises a plurality of square pixel blocks having P differential pixels $\Delta x_i(m,n)$ on each side, where N/P, and M/P are integer values, and
 said layered resolution encoder transforms said differential pixels within each said pixel block into a corresponding square coefficient block of DCT coefficients, having P coefficients on each side, representing video information about said differential pixels $\Delta x_i(n,m)$ within said corresponding pixel block.

11. The apparatus of claim 11 wherein said DCT coefficients within each said coefficient block are separated into said coefficient layers.

12. The apparatus of claim 1 wherein said information field portion comprises an adaptation overhead field portion comprising
 a cell sequence number for indicating the temporal relationship of said ATM packet relative to other said ATM packets, and
 a sync flag taking one of a plurality of states for indicating the composition of the remainder of said information field portion, said sync flag taking a first state when said information field portion includes a first type of information field, and a second state when said information field portion includes a second type of information field.

13. The apparatus of claim 12 wherein said first type of information field comprises an adaptation overhead field portion further comprising
 a coding mode field for indicating whether said data sets are encoded in said inter-frame or said intra-frame coding mode, and
 a component type field for indicating to which said color video component said data sets belong.

14. The apparatus of claim 12 wherein
 said difference frame $\Delta f_i$ comprises a plurality of square pixel blocks having P differential pixels $\Delta x_i(m,n)$ on each side, where N/P, and M/P are integer values,
 said layered resolution encoder comprises a discrete cosine transform (DCT) for transforming said differential pixels Δx$_i$(n,m) in each said pixel block into a corresponding block of DCT coefficients representing said differential pixels in said corresponding pixel block, said DCT coefficients separable into said plurality of said data sets providing coefficient layers for each said DCT coefficient block, and said first type of information field comprises an adaptation overhead field portion further comprising a resolution information field for indicating which said coefficient layers are available to be transferred between said devices for each said coefficient block.

15. The apparatus of claim 14 wherein said resolution information field comprises
   a data bit corresponding to each said coefficient block, each said data bit taking a first state when no said coefficient layers are available to be transferred for said corresponding coefficient block, and each said data bit taking a second state when all said coefficient layers are available to be transferred for said corresponding coefficient block.

16. The apparatus of claim 14 wherein said resolution information field comprises
   a block resolution field corresponding to each said coefficient block, each said block resolution field taking one of a plurality of states for indicating which said coefficient layers are available to be transferred for said corresponding coefficient block.

17. A method for encoding a digital video frame f$_i$, having N rows and M columns of pixels x$_i$(n,m), for transmission over a digital communications channel, comprising the steps of
   selecting between an inter-frame encoding mode and an intra-frame encoding mode for differentially encoding pixels x$_i$(n,m) of a video frame f$_i$ into corresponding differentially encoded pixels Δx$_i$(n,m) of a difference frame Δf$_i$, said selection being determined by the relative motion between said video frame f$_i$ and a previous video frame f$_{i-1}$,
   said step of selecting between an inter-frame encoding mode and an intra-frame encoding mode further including detecting the relative motion between said video frame f$_i$ and said previous video frame f$_{i-1}$, and computing a decision parameter K representing the level of detected relative motion, K being computed by $$K = k_1 \overline{\Delta x_i} + k_2 \sigma$$

where $\overline{\Delta x_i}$ and $\sigma^2$ are an estimate of the mean and variance, respectively, of difference pixel values Δx$_i$(n,m), k1 and k2 are weighting coefficients each having a value between 0 and 1 such that k$_1$+k$_2$=1, selecting said inter-frame encoder when K<T, selecting said intra-frame encoder when K≧T, where T represents a threshold parameter T having a value between 0 and 1,
   if said inter-frame encoding mode is selected, then encoding a said pixel x$_i$(n,m) of frame f$_i$ into a corresponding differentially encoded pixel Δx$_i$(n,m) of said difference frame Δf$_i$, dependent on the corresponding pixel x$_{i-1}$(n,m) of said previous vide frame f$_{i-1}$, and
   if said intra-frame encoding mode is selected, then encoding a said pixel x$_i$(n,m) of said frame f$_i$ into a corresponding differentially encoded pixel Δx$_i$(n,m) computed by Δx$_i$(n,m)=x$_i$(n,m)−x$_{i-1}$(n,m) dependent on other said pixels of the same said video frame f$_i$,
   layer encoding said differential pixels Δx$_i$(n,m) of frame Δf$_i$ into a plurality of separable data sets, each said data set representing video information, within a particular range of video image resolution, about said differential pixels Δx$_i$(n,m),
   formatting said plurality of data sets, into at least one asynchronous transfer mode (ATM) packet for transmission over the digital communications channel, said ATM packet comprising a header field portion having data for establishing a virtual communications channel between selected devices on the digital communications channel, and an information field portion for transferring said plurality of data sets between said selected devices.

18. The method of claim 17, wherein
   said estimate of mean difference pixel value Δx$_i$ is computed by $$\Delta x_i = \sum_{j=1}^{J} \Delta x_i(j)/J$$

and, said estimate of mean difference pixel variance $\sigma^2$ is computed by $$\sigma^2 = \sum_{j=1}^{J} (\Delta x_i(j) - \Delta x_i)^2/J$$

where Δx$_i$(j) is a short notation for J randomly selected pixels Δx$_i$(m,n) of difference frame Δf$_i$.

19. The method of claim 17 wherein said selecting step comprises
   combining said inter-frame and intra-frame encoding modes to provide a differentially encoded difference frame Δf$_i$ having a first set of pixels Δx$_i$(m,n) encoded by said inter-frame encoding mode, and a second set of pixels Δx$_i$(m,n) encoded by said intra-frame encoding mode.

20. The method of claim 19 wherein said second set of pixels Δx$_i$(m,n) comprises
   at least one square pixel block having P pixels Δx$_i$(m,n) on each side, where N/P, and M/P are integer values.

21. The method of claim 20 wherein said second set of pixels Δx$_i$(m,n) comprises
   a vertical strip portion having a width of P pixels and a length of N pixels such that said vertical strip portion comprises a quantity N/P of said pixel blocks arranged vertically aligned and non-overlapping.

22. The method of claim 21 further comprising the step of
   horizontally offsetting the position of said vertical strip portion of said second set of pixels Δx$_{i+1}$(m,n) of frame f$_{i+1}$ from the position of said vertical strip portion of said second set of pixels Δx$_i$(m,n) of frame f$_i$ by at least P said pixels.

23. The method of claim 20 wherein said second set of pixels Δx$_i$(m,n) comprises
   a horizontal strip portion having a width of M pixels and a length of P pixels such that said horizontal strip portion comprises a quantity M/P of said pixel blocks arranged horizontally aligned and non-overlapping.

24. The method of claim 23 further comprising the step of
- vertically offsetting the position of said horizontal strip portion of said second set of pixels $\Delta x_{i+1}(m,n)$ of frame $f_{i+1}$ from the position of said horizontal strip portion of said second set of pixels $\Delta x_i(m,n)$ of frame $f_i$ by at least P said pixels.

25. The method of claim 17 wherein said layer encoding step comprises
- transforming said differential pixels $\Delta x_i(n,m)$ into a plurality of discrete cosine transform (DCT) coefficients representing said differential pixels, and
- separating said DCT coefficients into said plurality of said data sets providing coefficient layers.

26. The method of claim 25 wherein
- said difference frame $\Delta f_i$ comprises a plurality of square pixel blocks having P differential pixels $\Delta x_i(m,n)$ on each side, where N/P, and M/P are integer values, and
- said transforming step transforms said differential pixels within each said pixel block into a corresponding square coefficient block of DCT coefficients, having P coefficients on each side, representing video information about said differential pixels $\Delta x_i(n,m)$ within said corresponding pixel block.

27. The method of claim 33 further comprising the step of separating said DCT coefficients within each said coefficient block into said coefficient layers.

28. The method of claim 17 wherein said information field portion comprises an adaptation overhead field portion comprising
- a cell sequence number for indicating the temporal relationship of said ATM packet relative to other said ATM packets, and
- a sync flag taking one of a plurality of states for indicating the composition of the remainder of said information field portion, said sync flag taking a first state when said information field portion includes a first type of information field, and a second state when said information field portion includes a second type of information field.

29. The method of claim 28 wherein said first type of information field comprises an adaptation overhead field portion further comprising
- a coding mode field for indicating whether said data sets are encoded in said inter-frame or said intra-frame coding mode, and
- a component type field for indicating to which said color video component said data sets belong.

30. The method of claim 28 wherein
- said difference frame $\Delta f_i$ comprises a plurality of square pixel blocks having P differential pixels $\Delta x_i(m,n)$ on each side, where N/P, and M/P are integer values,
- said layer encoding step comprises transforming said differential pixels $\Delta x_i(n,m)$ in each said pixel block into a corresponding block of discrete cosine transform (DCT) coefficients representing said differential pixels in said corresponding pixel block, and
- separating said DCT coefficients into said plurality of said data sets providing coefficient layers for each said DCT coefficient block, and
- wherein said first type of information field comprises an adaptation overhead field portion further comprising a resolution information field for indicating which said coefficient layers are available to be transferred between said devices for each said coefficient block.

31. The method of claim 20 wherein said resolution information field comprises
- a data bit corresponding to each said coefficient block, each said data bit taking a first state when no said coefficient layers are available to be transferred for said corresponding coefficient block, and each said data bit taking a second state when all said coefficient layers are available to be transferred for said corresponding coefficient block.

32. The method of claim 30 wherein said resolution information field comprises
- a block resolution field corresponding to each said coefficient block, each said block resolution field taking one of a plurality of states for indicating which said coefficient layers are available to be transferred for said corresponding coefficient block.

33. An apparatus for transferring a digital video frame $f_i$, having N rows and M columns of pixels $x_i(n,m)$, for transmission over a digital communications channel, comprising
- an inter-frame encoder for encoding a said pixel $x_i(n,m)$ of a video frame $f_i$ into a corresponding differentially encoded pixel $\Delta x_i(n,m)$ of a difference frame $\Delta f_i$ dependent on the corresponding pixel $x_{i-1}(n,m)$ of a previous video frame $f_{i-1}$,
- an intra-frame encoder for encoding a said pixel $x_i(n,m)$ of a video frame $f_i$ into a corresponding differentially encoded pixel $\Delta x_i(n,m)$ dependent on other pixels of the same said frame $f_i$,
- an encoding selector for selecting between said inter-frame encoder and said intra-frame encoder for differentially encoding pixels $\Delta x_i(n,m)$ of said frame $f_i$ into corresponding differentially encoded pixels $\Delta x_i(n,m)$ of said frame $\Delta f_i$, said encoding selector being responsive to the relative motion between said video frame $f_i$ and said previous vide frame $f_{i-1}$, and
- a layered resolution encoder for encoding said differential pixels $\Delta x_i(n,m)$ of frames $\Delta f_i$ into a plurality of separable data sets, each said data set representing video information, within a particular range of video image resolution, about said differential pixels $\Delta x_i(n,m)$,
- a packetizer for formatting said plurality of data sets into at least one asynchronous transfer mode (ATM) packet for transmission over the digital communications channel, said ATM packet comprising a header field portion having data for establishing a virtual communications channel between selected devices on the digital communications channel, and an information field portion for transferring said plurality of data sets between said selected devices,
- said information field portion having an adaptation overhead field portion including a cell sequence number for indicating the temporal relationship of said ATM packet relative to other said ATM packets, and
- a sync flag taking one of a plurality of states for indicating the composition of the remainder of said information field portion, said sync flag taking a first state when said information field portion includes a first type of information field, and a second state when said information field portion includes a second type of information field,
- said encoding selector comprises a composite frame combiner for providing a differentially encoded difference frame $\Delta f_i$ having a first set of pixels $\Delta x_i(n,m)$ encoded by said inter-frame encoder, and a second set of pixels $\Delta x_i(n,m)$ encoded by said intra-frame encoder, and said first type of information field comprises and adaptation overhead field portion further comprising a strip location field for indicating the location of said second set of pixels relative to said first set of pixels within said encoded difference frame $\Delta f_i$.

* * * * *